United States Patent

Nelson

[15] 3,661,717
[45] May 9, 1972

[54] UNITARY STERILITY INDICATOR AND METHOD

[72] Inventor: Robert L. Nelson, Minneapolis, Minn.
[73] Assignee: Minnesota Mining and Manufacturing Company, St. Paul, Minn.
[22] Filed: May 8, 1970
[21] Appl. No.: 35,763

Related U.S. Application Data

[63] Continuation-in-part of Ser. No. 830,698, June 5, 1969.

[52] U.S. Cl. ................................195/103.5 R, 195/54
[51] Int. Cl. .........................................C12k 1/00
[58] Field of Search ..........................195/103.5, 127, 54

[56] References Cited

UNITED STATES PATENTS 3,440,144  4/1969  Andersen..................195/103.5 R

Primary Examiner—A. Louis Monacell
Assistant Examiner—Max D. Hensley
Attorney—Kinney, Alexander, Sell, Steldt & Delahunt

[57] ABSTRACT

A unitary sterility indicator and a method for its use, the indicator comprising a deformable, translucent outer compartment having a closed, gas-transmissive, bacteria-impermeable opening therein and containing a predetermined number of viable microorganisms; a normally sealed, pressure-openable inner compartment snugly disposed in the outer compartment and containing an aqueous nutrient medium; and a detector material sensitive to microorganism growth and contained in one or both compartments.

11 Claims, 4 Drawing Figures

PATENTED MAY 9 1972 3,661,717

INVENTOR.
ROBERT L. NELSON
BY Kinney, Alexander,
Sell, Steldt & DeLaHunt
ATTORNEYS

UNITARY STERILITY INDICATOR AND METHOD

This invention is a continuation-in-part of copending application Ser. No. 830,698, filed June 5, 1969, now abandoned.

This invention relates to a unitary sterility indicator for determining the efficacy of the sterilization of microorganisms, and a method for its use.

Sterilization of medical instruments, glassware, and the like is a standard hospital procedure which is commonly employed to prevent the spread of disease. Sterilizing media such as steam, dry heat, sterilizing gases and radiation have been successfully employed. Problems have arisen, however, in determining the completeness or efficacy of sterilization procedures. It is highly desirable that means be provided whereby the efficacy of a sterilization cycle may be determined quickly and reliably, and without undue laboratory manipulations.

Temperature indicators (for dry heat sterilization) per se are not time sensitive and are thus quite inadequate. Many other solutions to the problem of testing the efficacy of a sterilization cycle than simple temperature indicators have been proposed. For example, U. S. Pat. No. 2,931,757 teaches the use of a strip of material bearing a predetermined number of viable bacterial spores. The strip is subjected to a sterilization cycle being tested. Any spores remaining viable after sterilization are detected by known methods. Aseptic techniques must be employed to avoid contaminating the strip during its use. This method is quite time consuming and requires the services of a skilled technician.

U. S. Pat. No. 3,346,464 illustrates a sterilization indicator which consists of a semi-permeable envelope capable of transmitting water and gaseous sterilizing media therethrough. In one embodiment, the envelope contains a quantity of dry test organism and a quantity of dry growth (nutrient) media. After exposure to a sterilization cycle, this envelope is immersed in a warm water bath. Water permeates the semi-permeable envelope and permits the growth media to be carried to the test organism, resulting in the growth of any remaining viable test organisms. Organism growth is reflected, for example, by a color change provided by a suitable indicator dye. In a second embodiment, the growth media is provided in the water bath such that, upon immersion of the semi-permeable envelope into the bath, the growth media is carried into the envelope and comes into contact with the test organism, giving similar results. The results which are obtainable with such indicators are consequently dependent upon the characteristics of the water in the water bath (e.g., pH, purity, etc.). Further, the use of gas-retaining enclosure envelopes may give rise to sterilizing gas entrapment which may influence sterility readings.

It is an object of the present invention to provide a reliable, self-contained sterility indicator for testing the efficacy of a sterilization cycle, and a method for using the indicator which is simple and which provides reproducible results.

Briefly, the unitary sterility indicator of the present invention comprises, in combination, a. means defining a deformable, translucent outer compartment having liquid-impermeable and substantially non-gas-absorptive walls, said compartment having at least one opening therein and containing a predetermined number of viable microorganisms;

b. a gas-transmissive, bacteria-impermeable closure member which normally closes said at least one opening;

c. means defining a normally sealed, pressure-openable, gas and liquid impermeable inner compartment containing an aqueous nutrient medium capable, with incubation, of promoting growth of the viable microorganisms when contacted therewith, the inner compartment being disposed in the outer compartment in snug engagement therewith to open upon deformation of the outer compartment to permit the nutrient medium to contact the microorganisms; and d. a detector material contained in at least one of the compartments and capable of undergoing a visible color change in response to growth of the microorganisms.

Briefly, the method of the present invention comprises the sequential steps of subjecting the indicator of the present invention to a sterilization cycle, opening the inner compartment of the sterility indicator by deformation of the outer compartment thereby permitting the aqueous nutrient medium to contact any remaining viable microorganisms, and thereafter incubating the sterility indicator under conditions suitable to promote growth of the viable microorganisms.

The invention may be more easily understood by reference to the accompanying drawing wherein.

Bacterial spores which may be employed in the present invention include Bacillus subtilis, Bacillus stearothermophilus, Clostridium sporogenes, etc. Fungal spores which may be employed in the present invention include Neurospora, Pithomyces, and Daldinia, etc. By "microorganisms," reference is made to bacteria, fungi, protozoa, and the like, e.g., microorganisms which may be killed by sterilization. The most favorable results have been obtained with bacteria and fungi which exist in both "spore" and "vegatative" states. Bacteria and fungi are commonly more resistant to sterilization in the spore state than in the vegetative state. Hence, to provide a margin of safety, bacteria and fungi in the spore state are preferably used in the present invention. A further margin of safety is provided by employing microorganisms which are more highly resistant to the selected sterilizing means than are the microorganisms which are intended to be killed during the sterilization cycle.

The present invention, although herein described primarily in terms of a single microorganism species, should be understood to refer as well to the use of a plurality of microorganism species. For example, a single sterility indicator may contain three species of microorganisms, one species being resistant to heat, a second species being resistant to gaseous sterilizing media, and the third species being resistant to radiation (e.g., X-rays).

Figure 2:
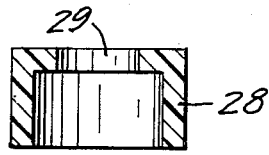
FIG. 2 is a cross-sectional view of an apertured cap member adapted to engage the open end of the apparatus of FIG. 1.
Figure 1:
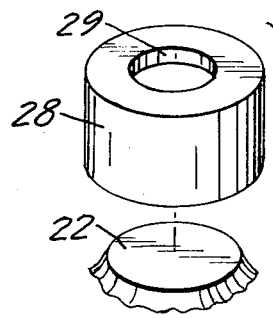
FIG. 1 is a cross-sectional view of a preferred embodiment of an apparatus of the present invention.
Figure 1:
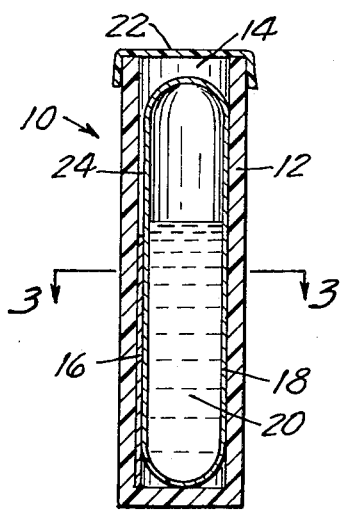
Figure 4:
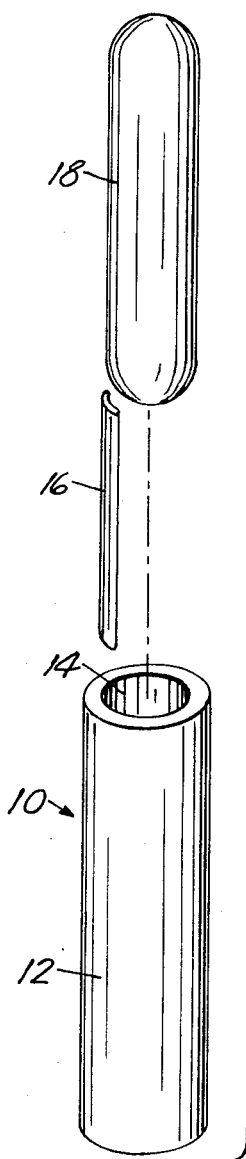
FIG. 4 is an exploded perspective view of the apparatus of FIG. 1.
Figure 3:
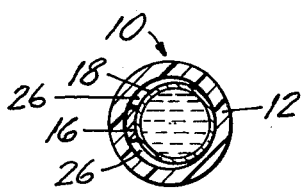
FIG. 3 is a cross-sectional view of the apparatus of FIG. 1 taken along lines 3—3 of FIG. 1.

Referring now to FIGS. 1 and 4, a sterility indicator is shown having an outer compartment comprising a flexible, translucent, cylindrical tube 10, having substantially gas non-absorptive and liquid impermeable walls 12 and an open end 14. Tube 10 contains a strip of filter paper 16 bearing a predetermined number of viable microorganisms, e.g., bacterial spores. Tube 10 also contains, in coacting relationship therewith, a normally sealed, pressure-openable inner compartment 18, such as a frangible glass ampoule, containing an aqueous nutrient medium 20 which is capable, with incubation, of promoting growth of the spores when contacted therewith. The inner compartment is snugly retained within the outer compartment, as illustrated by FIGS. 1 and 3, so that very little of the volume of the outer compartment remains unoccupied. The glass ampoule 18 is separated from the wall 12 of the tube 10 by the filter paper strip 16, thereby providing cavities 24 and 26 between the wall 12 and the ampoule 18. The open end 14 of the tube 10 is provided with a gas-transmissive, bacteria-impermeable closure member which is shown as a sheet 22. The sheet 22 may be sealed to the open end 14 of the tube 10 by e.g., heat or adhesive sealing, or by means of cap 28 (shown removed in FIG. 2) which has an aperture 29 therethrough adjacent the sheet 22. During sterilization with a gaseous sterilization medium, the gaseous medium permeates the sheet 22 and passes through cavities 24 and 26 to contact the spore-containing filter paper strip 16.

As shown in FIG. 4, the apparatus of FIG. 1 may be easily assembled by sequentially inserting into the open end 14 of the tube 10 the spore-containing filter paper 16 and the frangible glass ampoule 18, and sealing the open end 14 of the tube with the sheet 22.

One or both of the compartments of the apparatus of the present invention also contain a detector material (not shown) which is capable of undergoing a visible color change in response to growth of the spores.

The apparatus of FIG. 1 may be employed to test the efficacy of a sterilization cycle in the following manner:

The sterility indicator apparatus containing bacterial spores is placed in a tray together with a number of items to be sterilized by, for example, ethylene oxide gas. The tray is inserted in a suitable sterilizing chamber, a vacuum is drawn, and ethylene oxide gas is introduced into the chamber. The ethylene oxide gas is introduced into the chamber. The ethylene oxide gas permeates through the sheet 22 and passes through the cavities 24 and 26 to kill the microorganism spores on the filter paper 16. At the end of the sterilizing period a vacuum is again drawn on the sterilizing chamber and the ethylene oxide gas is replaced with filtered air. The sterility indicator is withdrawn from the tray and is pinched between the thumb and forefinger to rupture the frangible glass ampoule 18, causing the nutrient media 20 to contact the filter paper strip 16. The indicator is then placed in a suitable incubating environment (e.g., the indicator may be placed in water at about 37° C. for about 48 hours). Any spores not killed by the ethylene oxide gas begin to germinate and grow during incubation, causing the detector material contained in the indicator to change color. The occurance of a color change is observed through the translucent walls 12 of the tube 10, and indicates to an observer that the sterilization cycle had not killed all of the spores on the filter paper and hence was perhaps insufficient to completely sterilize the other items in the tray. An absence of color change, however, indicates that the sterilization cycle had killed all of the spores on the filter paper and hence was sufficient to sterilize the items in the tray.

The sterility indicator of the present invention has been described primarily with reference to gaseous sterilizing media such as ethylene oxide, steam, and the like. The indicator is not limited to use with gaseous media, however, and may as well be used to indicate the efficacy of other sterilizing media, such as dry heat and radiation.

As will be evident from the above examples, the outer compartment of the sterility indicator which contains the viable microorganisms and in which microorganism growth occurs during incubation must be translucent (including "transparent") so that a color change may be visually observed without disassembling the apparatus, and must be sufficiently deformable so that the pressure-openable inner compartment is opened when the outer compartment is deformed. The walls of the outer compartment should in addition be substantially non-absorbent of gases and impermeable to liquids and, together with the closure member, preferably should snugly engage the inner compartment. It has been discovered that snug engagement between the inner and outer compartments is desirable to avoid relatively large void spaces in which sterilizing gases could become entrapped during the sterilizing cycle, thereby contributing to rupture of the outer container during evacuation. Further, release of the so-entrapped gas during the subsequent incubation period may permit the then more susceptible microorganisms which survived the sterilization cycle to be killed, thereby adversely influencing the sterility test. By "snug engagement" is meant that at least about 70 percent (preferably 80 percent) of the volume of the closed outer container is filled by the inner compartment. If the walls of the compartment were absorbent of gaseous sterilizing media, the gas could be released during incubation to prevent growth of the microorganisms, resulting in a false indication of sterility. The microorganism-containing outer compartment preferably is made of a flexible plastic material which is sufficient temperature resistant to withstand steam or dry heat sterilization cycles, which is non-absorbent of gaseous sterilizing media, and which is liquid-impermeable. Polymeric materials which have been found to possess such characteristics include polypropylene, polyamides (nylons), and various polyesters.

The microorganisms which are employed in the present invention normally are carried on or in a suitable substrate. It is contemplated, for example, that microorganisms may be carried by the inner walls of the outer compartment. Preferably, however, the microorganisms are carried by a separate substrate, such as one of the substrates described in U. S. Pat. No. 2,931,757. The substrate preferably is water-absorbent, and should not inhibit microorganism growth. Sheet-like, water-absorbent materials such as filter paper, cloth, etc. are especially preferred. To promote microorganism growth during incubation, it is desired that water-absorbent substrates contain a small amount of water. For example, spore-bearing filter paper strips which have been conditioned for several hours at 23° C. and 50 percent relative humidity have given excellent results. Spore-bearing metal foil substrates, for example, aluminum or stainless steel may be used, as well as substrates of glass (e.g., glass beads) porcelain, etc.

To assure reproducibility, it is desired that the outer compartment contain a predetermined approximate number of microorganisms. This is readily accomplished with bacterial or fungal spores by preparing an aqueous spore suspension having a known volumetric spore concentration, moistening a substrate (e.g., filter paper) with a small, predetermined volume of the suspension, and drying the substrate. This method permits the approximate number of spores contained on the substrate to be easily calculated. Other methods, of course, may also be employed.

As recited above, the microorganism-containing outer compartment has at least one opening therein to permit gaseous sterilizing media (e.g., steam, ethylene oxide) to contact the microorganisms during sterilization. This opening is normally closed or plugged with a gas-transmissive, bacteria-impermeable closure member. Suitable closure member materials include fibrous materials such as cotton, glass wool, cloth, etc., open celled polymeric foams, and semi-permeable plastic films such as those described in U. S. Pat. No. 3,346,464. Fibrous or cellular materials are preferred because of the ease with which such materials transmit sterilizing gases. Especially preferred is a fibrous polyethylene sheet available from E. I. Du Pont de Nemours and Co. under the trade name "Tyvek." In effect, the fibrous or cellular closure members serve as filters for bacteria and fungi and hence should have pore sizes no larger than about 0.5 microns (e.g., be capable of preventing the passage therethrough of particles having dimensions larger than about 0.5 microns).

The aqueous nutrient media which are employed in the present invention are widely known to the art. Examples of preferred nutrient media are aqueous solutions of Tryptic Soy Broth (a product of Difco Laboratories, Inc.), fluid thioglycollate and Dextrose Tryptone (Difco Laboratories, Inc.). Tryptic Soy Broth is especially preferred. To avoid contamination, such aqueous nutrient media normally is sterilized after having been placed in the inner compartment.

The inner compartment, which contains the aqueous nutrient medium, is of material which is impermeable to gases and liquids and is capable of being opened upon the application of pressure thereto i.e., "pressure openable") to permit the nutrient medium to enter the microorganism-containing outer compartment. The inner compartment is preferably of frangible material, such as glass, and, as mentioned above, is snugly carried within the outer compartment in coacting relationship therewith to permit breakage or crushing of the inner compartment when the outer compartment is deformed (e.g., pinched between the thumb and forefinger). In another embodiment, the inner compartment may be sealed with a plug such that the plug is expelled to release the contents of the inner compartment upon application of pressure.

The growth of microorganisms which may remain viable after sterilization is detected by the change in color of a detector material contained in at least one of the compartments. The detector material preferably is soluble in, and imparts color (upon microorganism growth) to, the aqueous nutrient medium so that a change in color may be easily observed through the translucent walls of the outer compartment. Detector materials which may be employed in the present invention are well known to the art and include pH-sensitive dye indicators (such as bromthymol blue, brom cresol purple, phenol red, etc.), oxidation-reduction dye indicators (such as methylene blue, etc.). Such materials commonly undergo changes in color in response to a phenomenon of microorganism growth, such as changes in pH, oxidation-reduction potentials, etc.

What is claimed is:

1. Unitary sterility indicator comprising, in combination
   a. means defining a deformable, translucent outer compartment having liquid impermeable and substantially non-gas absorptive walls, said compartment having at least one opening therein and containing a predetermined number of viable microorganisms;
   b. a gas-transmissive, bacteria-impermeable closure member normally closing said at least one opening;
   c. means defining a normally sealed, pressure-openable, gas and liquid impermeable inner compartment containing an aqueous nutrient medium capable, with incubation, of promoting growth of said viable microorganisms, said inner compartment being disposed in said outer compartment in snug engagement therewith to open upon deformation of said outer compartment, thereby permitting said nutrient medium to contact said microorganisms; and
   d. a detector material contained in at least one of said compartments and capable of undergoing a visible color change in response to growth of said microorganisms.

2. The indicator of claim 1 wherein said inner compartment is a frangible glass ampoule.

3. The indicator of claim 1 wherein said viable microorganisms are carried by a sheet-like substrate which does not inhibit microorganism growth.

4. The indicator of claim 3 wherein said substrate is water absorbent.

5. The indicator of claim 1 wherein said substrate is metal, or glass beads.

6. Unitary sterility indicator comprising, in combination,
   a. a deformable, translucent cylindrical tube having liquid-impermeable and substantially gas-non-absorbing walls and an open end;
   b. a gas-transmissive, bacteria-impermeable closure member normally closing the open end of the tube;
   c. a water-absorbent, sheet-like substrate of material which does not inhibit microorganism growth and which carries a predetermined number of viable microorganisms, said substrate being disposed within said tube;
   d. a sealed, frangible glass ampoule carried within and in snug engagement with said tube adjacent said substrate and adapted to be broken when said tube is deformed, said ampoule containing an aqueous nutrient medium which is capable, with incubation, of promoting growth of said microorganisms; and
   e. a detector material contained in said aqueous nutrient medium and capable of undergoing a visible color change in response to growth of said microorganisms.

7. The indicator of claim 6 wherein said closure member is a fibrous polyethylene sheet.

8. The indicator of claim 6 wherein said closure member is of compacted cotton fibers or of open-celled polymeric foam.

9. The indicator of claim 6 wherein said closure member is capable of preventing the passage therethrough of particles having dimensions larger than about 0.5 microns.

10. The indicator of claim 7 additionally comprising a cap member normally sealing said fibrous sheet to said open end of said tube, said cap member having an aperture therethrough adjacent said sheet.

11. Method for testing the efficacy of a sterilization cycle comprising the sequential steps of
    a. subjecting to said sterilization cycle a unitary sterility indicator comprising
       means defining a deformable, translucent, outer compartment having liquid impermeable and substantially gas non-absorptive walls, said compartment having at least one opening therein and containing a predetermined number of viable microorganisms; a gas-transmissive, bacteria-impermeable closure member normally closing said at least one opening; means defining a pressure-openable, gas and liquid impermeable, sealed inner compartment containing an aqueous nutrient medium capable, with incubation, of promoting growth of said viable microorganisms when contacted therewith, said inner compartment being disposed in said outer compartment in snug engagement therewith to open upon deformation of said outer compartment to permit said nutrient medium to contact said microorganisms; and a detector material contained in at least one of said compartments and capable of undergoing a visible color change in response to growth of said microorganisms;
    b. deforming said outer compartment, after said sterilization cycle, to open said inner compartment and permit said aqueous nutrient medium to contact any of said microorganisms which may remain viable; and
    c. incubating said indicator under conditions suitable to promote growth of said viable microorganisms.

* * * * *